A. A. POCHYLA & H. A. KING.
VEHICLE SPRING.
APPLICATION FILED JUNE 7, 1909.

960,395.

Patented June 7, 1910.
2 SHEETS—SHEET 1.

A. A. POCHYLA & H. A. KING.
VEHICLE SPRING.
APPLICATION FILED JUNE 7, 1909.
960,395.
Patented June 7, 1910.
2 SHEETS—SHEET 2.
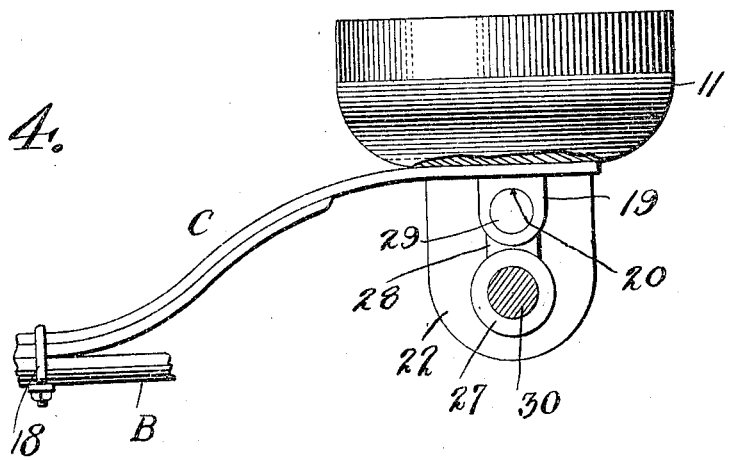
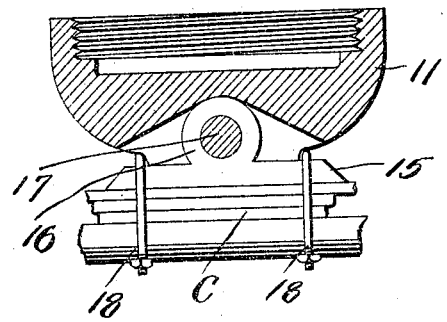
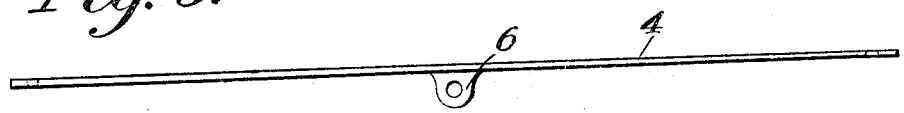
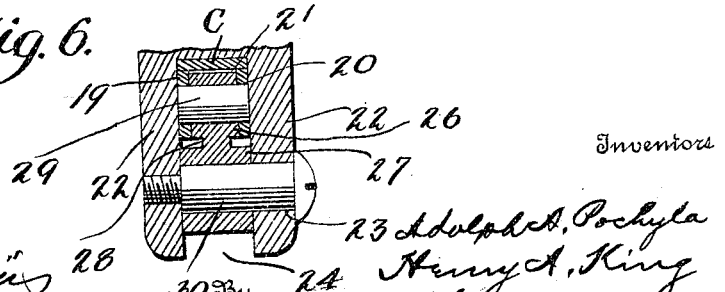
Witnesses
Jos. F. Collins
O. T. Randolph Jr.
Inventors
Adolph A. Pochyla
Henry A. King
By D. A. Gourick Attorney

UNITED STATES PATENT OFFICE.

ADOLPH ARNOLD POCHYLA, OF BARTLETT, AND HENRY ALLEN KING, OF WEST, TEXAS, ASSIGNORS OF ONE-THIRD TO J. D. PINKARD AND R. F. CATES, BOTH OF BARTLETT, TEXAS.

VEHICLE-SPRING.

960,395.  Specification of Letters Patent.  Patented June 7, 1910.

Application filed June 7, 1909. Serial No. 500,601.

*To all whom it may concern:*

Be it known that we, ADOLPH ARNOLD POCHYLA, of Bartlett, in the county of Williamson, in the State of Texas, and HENRY ALLEN KING, of West, in the county of McLennon and State of Texas, have invented certain new and useful Improvements in Vehicle-Springs, of which the following is a specification.

Our invention relates to springs for vehicles and has for its object the provision of telescoping casings containing expansible coil springs, one end of each of the casings being connected with the vehicle body, and the other end with the axle or a leaf spring secured to the axle.

The details of the construction of our improved spring will be described hereinafter and illustrated in the accompanying drawings in which—

Figure 1:
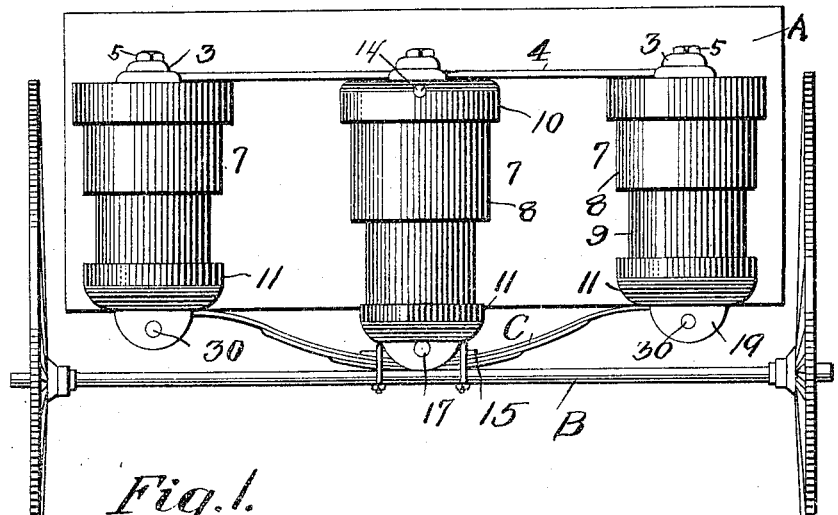
Figure 2:
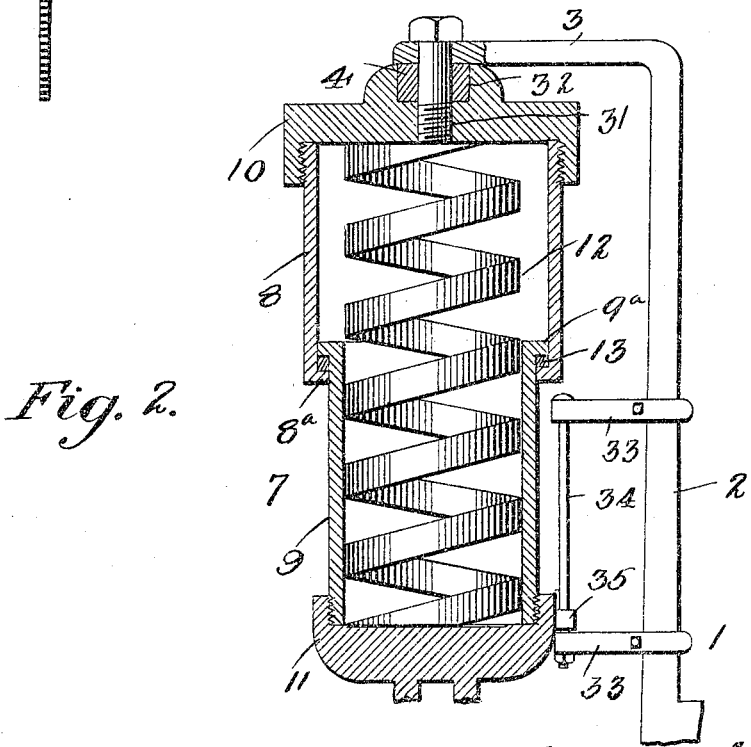

Figure 1 is a rear view of a vehicle showing our improved spring in position, Fig. 2, a side view of the rear fragment of the vehicle body showing the spring in place, Fig. 3, a detail view of the means for securing the middle cylinder to the axle, Fig. 4, a detail view of the means for securing one of the end cylinders to the end of the leaf spring, Fig. 5, a detail view of the cross-bar connecting the tops of the cylinders together, and Fig. 6, a fragmental sectional view showing the means for securing one of the end casings to the vehicle spring.

In the drawings similar reference characters indicate corresponding parts in all of the views.

A indicates the body of a vehicle, B its rear axle and C a leaf or bow spring secured in its middle to the middle of axle B.

1 indicates an angular bracket secured under the body A at each side thereof, each of said brackets having a vertical portion 2 and its upper end formed with a horizontal arm 3 extending rearwardly of the body.

4 indicates a cross-rod secured to horizontal arm 3 by means of threaded bolts 5 and having a perforated ear 6 in its middle.

Our improved springs are mounted in telescoping casings 7 consisting of cylindrical portions 8 and 9 screwed into or otherwise secured in cup-shaped ends 10 and 11 respectively. The cylindrical portion 8 is larger in diameter than portion 9 and is provided with an inwardly extending flange $8^a$, while the portion 9 is seated inside of flange $8^a$ and is formed with a lateral flange $9^a$ around its free edge that engages flange $8^a$ to limit the outer movement of the two parts of the casing under the impulse of coil spring 12 mounted in the casing. 13 indicates a rubber or other cushion ring secured to the under side of flange $9^a$ that engages flange $8^a$ when the casing is extended to break the jar incident to the extension of the casing.

In the drawings three casings 7 are shown in use, the middle casing secured at its upper end by a pin 14 through the cup shaped end 10 and ear 6 on cross-rod 4 while its lower end is secured to the middle of spring C and axle B by means of a plate 15 having a perforated ear 16 and a pin 17 extended through the lower cup 11 and said ear, the plate 15 being secured in position by the clips 18 that hold the spring C in position.

The ends of spring C have ears 19 on their under sides with alined transverse holes 20 therein, and spaced apart as shown at 21.

The underside of the cups 11 on the end casings 7 are each formed with ears 22 having alined transverse holes 23 therein and spaced apart by a space 24 wide enough to receive the spring C.

The ears 19 and 22 are connected by a link consisting of tubular bearings 26 and 27 at the ends of bar 28, the bearing 26 being as long as the width of space 21 while the bearing 27 is as long as the width of slot 24.

29 indicates a pin inserted in holes 20 and bearing 26 to secure the link to ears 19 and 30 a bolt secured in holes 23 and bearing 27.

The caps or ends 10 on the end casings 7 are secured in place by the bolts 5 used to hold the ends of cross rod 6 to the ends of arms 3, the caps being formed with threaded holes 31 to receive the bolts and having their top surfaces provided with a groove or depression 32 to receive the rod.

33 indicates brackets adjustably secured to the vertical portion 2 of bracket 1 and 34 a rod secured to the brackets and engaging an ear 35 on the cup 11 of casing 7, the purpose of this construction being to prevent end thrust of the vehicle body.

The link connection between the ends of the spring C and the end casings 7 is to permit the spring C to be depressed without moving the lower ends of the casings out of alinement.

Having thus described our invention what we claim is—

1. In combination with a vehicle body, its axle, and a leaf spring secured thereto, brackets secured to the vehicle body, a cross bar connecting said brackets, telescoping casings secured to the leaf spring aforesaid and to the cross-bar and brackets, and coil springs mounted in the casings.

2. In combination with a vehicle body, its axle, and a leaf spring secured thereto, brackets secured to the vehicle body, a cross-bar connecting said brackets, telescoping casings, coil springs mounted in said casings, one end of the casings being secured to the cross-bars and brackets, and links connecting the other ends of the casings with the ends of the leaf spring.

3. In combination with a vehicle body, its axle, and a leaf spring secured thereto, brackets secured to the vehicle body, the ends of the spring having perforated and slotted ears thereon, telescoping casings having one of their ends secured to the brackets aforesaid, the other ends having perforated and slotted ears to inclose the ends of the leaf spring and the ears thereon, and links connecting the ears on spring with the ears on the casings.

4. In combination with a vehicle body, its axle, and a leaf spring secured thereto, brackets secured to the vehicle body, a cross-rod secured to the brackets and having an ear in its middle, telescoping casings, coil springs mounted in said casings, one of said casings secured at one end to the ear on the rod aforesaid, a plate secured to the middle of the leaf spring and axle and having an ear thereon, the lower end of said casing being secured to the ear on said plate, other casings secured to the ends of said cross-rod, perforated and slotted ears on the ends of the leaf spring, the lower ends of the last mentioned casings provided with perforated and slotted ears to fit over the ends of the leaf spring, and links connecting the ears on the casings with the ears on the leaf spring.

In testimony whereof we hereto affix our signatures in the presence of two witnesses.

ADOLPH ARNOLD POCHYLA.
HENRY ALLEN KING.

Witnesses:
J. D. PINKARD,
M. EFROW.